US005907010A

United States Patent [19]
Weber et al.

[11] Patent Number: 5,907,010
[45] Date of Patent: May 25, 1999

[54] GRAFT COPOLYMERS OF POLYARYLENE ETHERS, POLYAMIDES AND COPOLYMERS WHICH CONTAIN CYCLIC, α,β-UNSATURATED DICARBOXYLIC ANHYDRIDES AS POLYMERIZED UNITS

[75] Inventors: Martin Weber, Neustadt; Norbert Güntherberg, Speyer, both of Germany

[73] Assignee: BASF Aktiengesellschaft, Ludwigshafen, Germany

[21] Appl. No.: 08/820,279

[22] Filed: Mar. 18, 1997

[30] Foreign Application Priority Data

Mar. 18, 1996 [DE] Germany ............... 196 10 572

[51] Int. Cl.$^6$ ............... C08L 39/04; C08L 71/00; C08L 77/00
[52] U.S. Cl. ............... 524/504; 524/505; 524/514; 524/516; 524/530; 524/531; 524/538; 524/555; 525/66; 525/73; 525/74; 525/77; 525/92 B; 525/397; 525/420; 525/425; 525/534

[58] Field of Search ............... 524/504, 505, 524/514, 516, 530, 531, 538, 555; 525/179, 182, 66, 203, 73, 74, 77, 397, 420, 425, 534

[56] References Cited

U.S. PATENT DOCUMENTS 5,457,169 10/1995 Weber et al. ............... 525/534
5,639,833 6/1997 Weber et al. ............... 525/420

*Primary Examiner*—Mark L. Warzel
*Attorney, Agent, or Firm*—Keil & Weinkauf

[57] ABSTRACT

Graft copolymers are obtainable by reacting
A) polyarylene ethers,
B) polyamides and
C) copolymers which contain cyclic, α,β-unsaturated dicarboxylic anhydrides
and are used for the preparation of thermoplastic molding materials or as compatibilizers for polymer blends based on polyarylene ethers and polyamides.

12 Claims, No Drawings

GRAFT COPOLYMERS OF POLYARYLENE ETHERS, POLYAMIDES AND COPOLYMERS WHICH CONTAIN CYCLIC, α,β-UNSATURATED DICARBOXYLIC ANHYDRIDES AS POLYMERIZED UNITS

The present invention relates to graft copolymers obtainable by reacting polyarylene ethers, polyamides and copolymers which contain cyclic, α,β-unsaturated dicarboxylic anhydrides as polymerized units.

For the production of household appliances and medical equipment and for use in the electrical or electronics sector, it is desirable to have molding materials which have good stability in continuous use in addition to high heat distortion resistance and good processability. These properties can be obtained in principle by mixing polyarylene ethers and polyamides. Such polymer blends do in fact combine the advantageous properties of the polyamides (easy processability, high resistance to chemicals) and of the polyarylene ethers (high heat stability, high heat distortion resistance, and low tendency to absorb water). Thus, U.S. Pat. No. 3,729,527 describes blends of polyaryl ether sulfones and polyamides which have better buckling strength and flowability. Better properties are possessed by the blends described in DE-A-4121705, which contain semicrystalline, partly aromatic polyamides as the polyamide component. Owing to their property profile, these blends are used as highly heat-stable molding materials for medical equipment or household appliances or in the electronics sector.

Owing to frequent incompatibility of these components (lack of interaction of the different chain segments), however, phase separation may occur. The phase structure of such blends is therefore very highly dependent on the processing conditions, which may lead to nonuniform mechanical properties within a molding. Moreover, the phase boundary in incompatible polymer blends is a weak point and the toughness of such materials is therefore generally unsatisfactory. This problem can in principle be solved by suitable compatibilizers (D. R. Paul in Polymer Blends, D. R. Paul, S. P. Newman, Academic Press, New York, 1978, Vol. II, page 35 et seq.). The purpose of the compatibilizers is to reduce the interfacial tension between the incompatible components in order to achieve a better distribution of the disperse phase in the matrix phase. Furthermore, the compatibilizer must produce an interaction between the incompatible phases so that stress can be effectively transferred across the phase boundary when a load is applied.

Compatibilizers for polymer blends based on polyarylene ethers can be prepared, for example, by reacting polyarylene ethers which have terminal hydroxyl, amino or epoxy groups with copolymers which contain anhydride groups (DE-A 4332542).

Suitable compatibilizers for blends of polyarylene ethers and polyamide are block copolymers comprising polysulfone and polyamide units. Such block copolymers are known and are described in several papers (see J. E. McGrath, L. M. Robeson and M. Matzner, Polym. Prep. 14, (1973) 1032; EP-A 374 988; C. E. Korning, R. Fayt, W. Bruls, L. v. D. Vondervoort, T. Rauch and P. Teyssié, Macromol. Chem., Macromol. Symp. 75, (1933), 159–166. However, the synthesis of the block copolymers described is very expensive and there has therefore been no lack of attempts to find other suitable compatibilizers. DE-A-3617501 describes blends of polyamides and polyarylene ethers which contain, as a compatibilizer, a polymeric component having hydroxyl groups, for example a polymer based on bisphenol A and epichlorohydrin. However, because the compatibilizer used has a lower glass transition temperature of 100° C., the heat distortion resistance of these blends is limited.

DE-A 4306708 describes molding materials which contain polyarylene ethers having terminal anhydride groups together with polyamides. These molding materials are suitable for the production of moldings which are subjected to high mechanical loads or chemical influences. They meet only some of the requirements stated at the outset.

It is an object of the present invention to provide a readily obtainable compatibilizer for polymer blends based on polyarylene ethers and polyamides, which permits the preparation of polymer blends having improved heat distortion resistance. It is a further object of the present invention to provide molding materials which are based on polyarylene ethers and polyamides and have good processability and high stability in continuous use in addition to high heat distortion resistance.

We have found that these objects are achieved by using graft copolymers obtainable by reacting A) from 5 to 85% by weight of at least one polyarylene ether having at least 30% of reactive terminal groups which are capable of reacting with the functional groups of component C, B) from 5 to 85% by weight of at least one thermoplastic polyamide and C) from 10 to 90% by weight of at least one copolymer which is composed of $c_1$) at least one aromatic vinyl compound, $c_2$) at least one cyclic, α,β-unsaturated dicarboxylic anhydride, $c_3$) at least one cyclic, α,β-unsaturated dicarboximide, $c_4$) if required, at least one further monomer copolymerizable with $c_1$ to $c_3$ The present invention furthermore relates to molding materials which contain the novel graft copolymers.

The present invention also relates to the use of graft copolymers for the production of highly heat-resistant fibers, films or moldings.

The novel graft copolymers contain, as component A, from 5 to 85, preferably from 10 to 75, % by weight of at least one polyarylene ether having reactive terminal groups. The polyarylene ethers used according to the invention contain repeating units of the general formula I

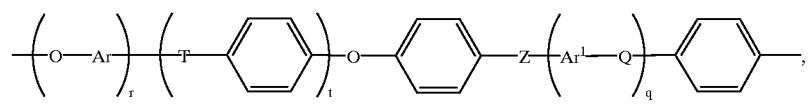

(I)

where r, t and q, independently of one another, are each 0, 1, 2 or 3. T, Q and Z may be identical or different and are each a chemical bond or a group selected from —O—, —S—, —SO$_2$—, S=O, C=O, —N=N—, —R$^a$C=CR$^b$— and —CR$^c$R$^d$—, with the proviso that at least one of the groups T, Q and Z is —SO$_2$— or C=O. R$^a$ and R$^b$, independently of one another, are each hydrogen or C$_1$–C$_{10}$-alkyl. R$^c$ and R$^d$, independently of one another, are each hydrogen, C$_1$–C$_{10}$-alkyl, C$_1$–C$_{10}$-alkoxy, such as methoxy, ethoxy, n-propoxy, i-propoxy, n-butoxy or C$_6$–C$_{18}$-aryl which may have C$_1$–C$_4$-alkyl substituents, such as phenyl, tolyl or naphthyl. Examples of C$_1$–C$_{10}$-alkyl are methyl, ethyl, n-propyl, isopropyl, n-butyl, tert-butyl and n-hexyl. However, R$^c$ and R$^d$ may also be linked to form a cycloaliphatic ring.

In this case, —CR$^c$R$^d$— is preferably cyclopentyl or cyclohexyl. These cycloaliphatic rings may in turn be substituted by one or more alkyl radicals, preferably methyl. T, Q and Z are preferably —O—, —SO$_2$—, C=O, a chemical bond or —CR$^c$R$^d$—. Preferred radicals R$^c$ and R$^d$ are hydrogen and methyl. Ar and Ar$^1$ are each C$_6$–C$_{18}$-arylene, such as 1,5-naphthylene, 1,6-naphthylene, 2,7-naphthylene, 1,5-anthrylene, 9,10-anthrylene, 2,6-anthrylene, 2,7-anthrylene or biphenylene, in particular phenylene, preferably p-phenylene. These arylene groups preferably have no substituents. However, they may have C$_1$–C$_{10}$-alkyl, such as methyl, ethyl, n-propyl, iso-propyl, tert-butyl or n-hexyl, C$_6$–C$_{18}$-aryl such as phenyl or naphthyl, C$_1$–C$_{10}$-alkoxy, such as methoxy, ethoxy, n-propoxy, isopropoxy or n-butoxy and/or halogen as substituents. Preferred substituents are methyl, phenyl, methoxy and/or chlorine.

Some suitable repeating units of the general formula I are shown below:

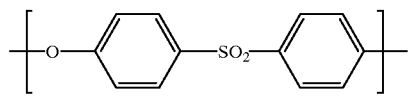

(I$_1$)

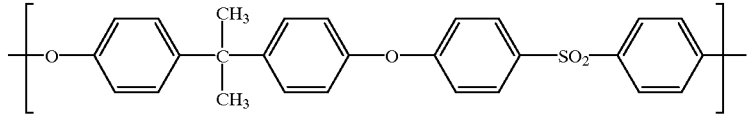

(I$_2$)

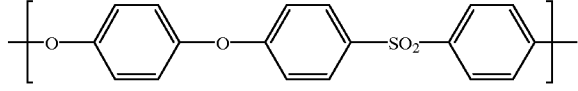

(I$_3$)

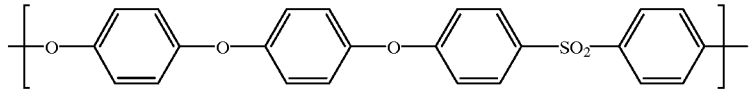

(I$_4$)

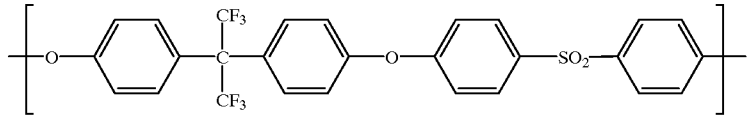

(I$_5$)

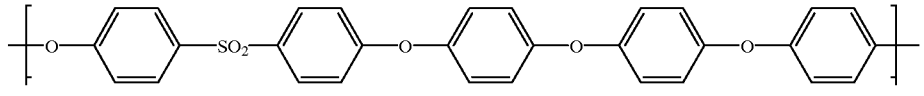

(I$_6$)

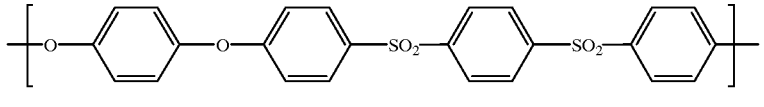

(I$_7$)

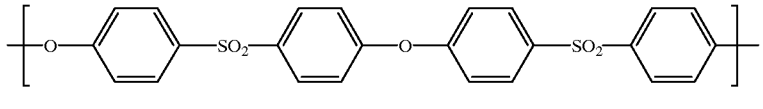

(I$_8$)

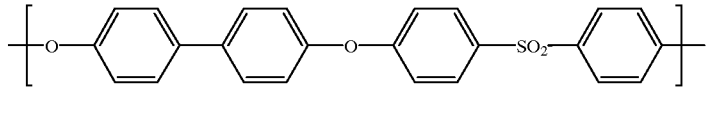

(I$_9$)

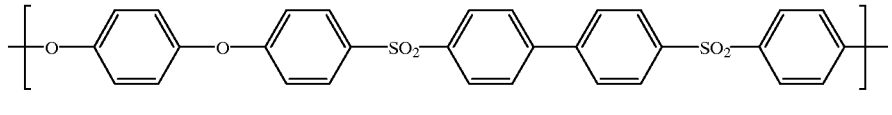

(I$_{10}$)

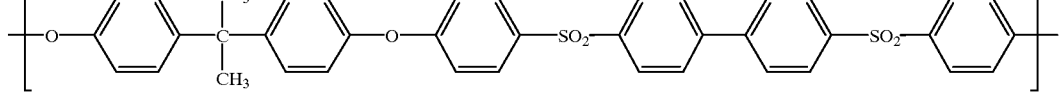

(I$_{11}$)

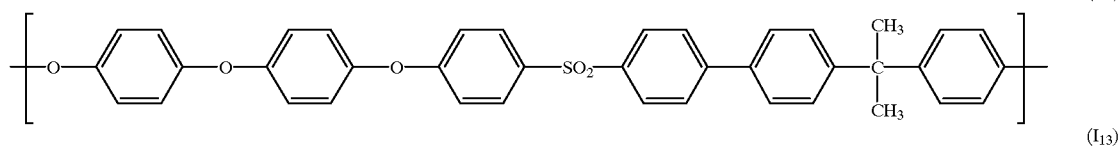
(I₁₂)
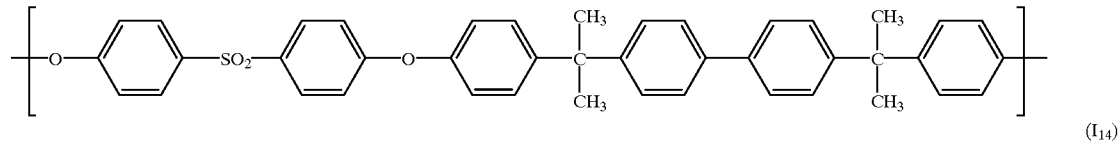
(I₁₃)
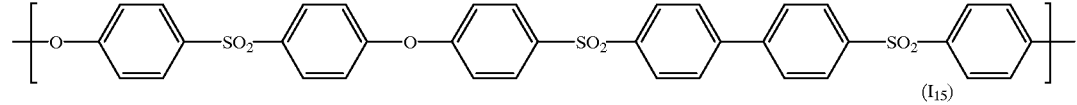
(I₁₄)
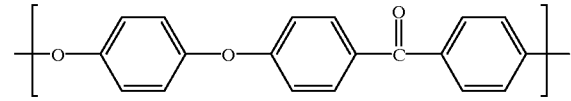
(I₁₅)
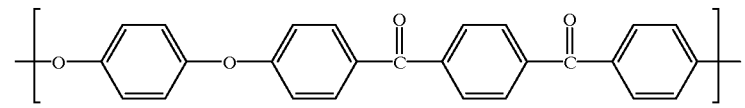
(I₁₆)
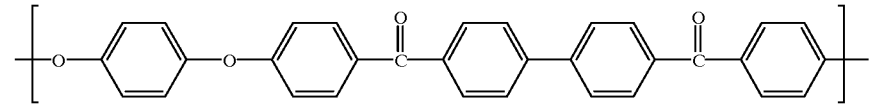
(I₁₇)
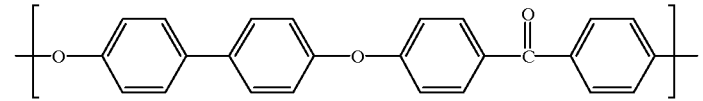
(I₁₈)
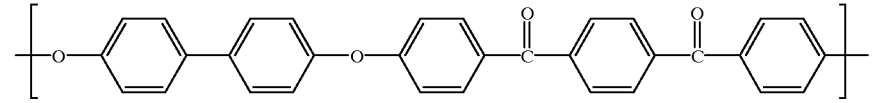
(I₁₉)
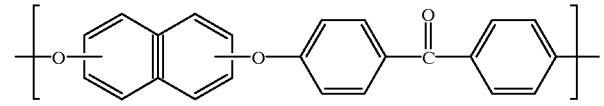
(I₂₀)
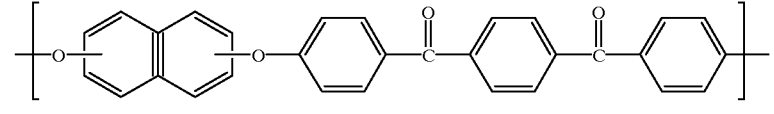
(I₂₁)
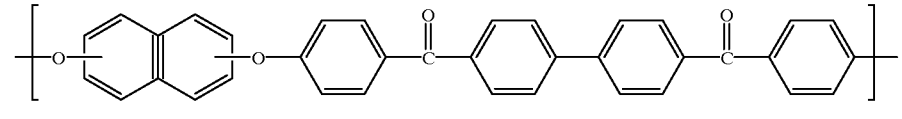
(I₂₂)
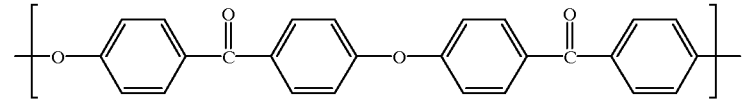
(I₂₃)
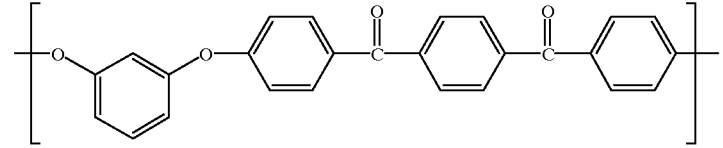
(I₂₄)

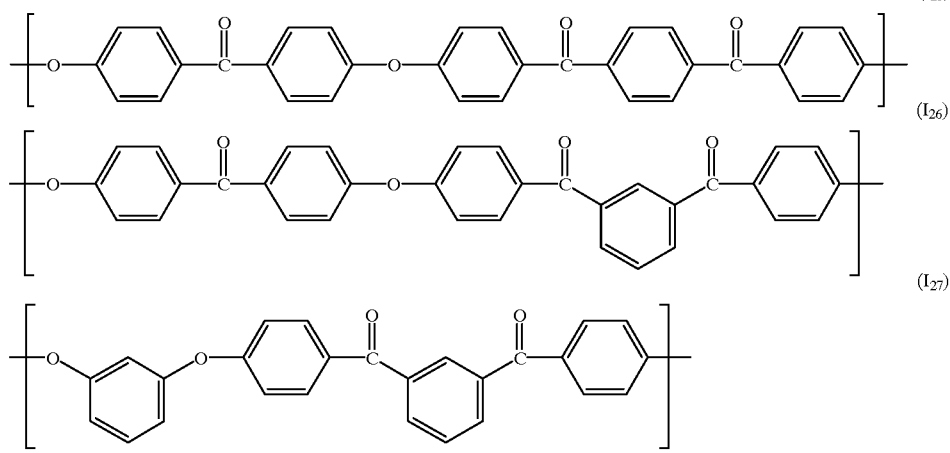

Particularly preferred arylene ethers A have the repeating units $I_1$, $I_2$, $I_{25}$ or $I_{26}$. These preferably include arylene ethers which contain from 3 to 97, in particular from 5 to 95, mol % of repeating units $I_1$ and from 3 to 97, in particular from 5 to 95, mol % of repeating units $I_2$. The viscosity number of the polyarylene ethers used according to the invention is from 13 to 95 cm³/g, corresponding to a number average molecular weight $M_n$ of from 1500 to 60,000 g/mol. The relative viscosity numbers are determined using 1% strength by weight solutions of the polyarylene ethers in N-methylpyrrolidone, in mixtures of phenol and dichlorobenzene or in 96% strength sulfuric acid, depending on the solubility, in each case at 20° C. or 25° C.

The polyarylene ethers are known per se and can be prepared by known methods.

They are formed, for example, by condensation of aromatic bis-halogen compounds with the alkali metal double salts of aromatic bisphenols. It can also be prepared, for example, by auto-condensation of alkali metal salts of aromatic halophenols in the presence of a catalyst. DE-A-38 43 438 gives, for example, a detailed list of suitable monomers. Suitable processes are described in, inter alia, U.S. Pat. No. 3,441,538, U.S. Pat. No. 4,108,837, DE-A 27 38 962 and EP-A 361. Polyarylene ethers which contain carbonyl functions are also obtainable by electrophilic (Friedel-Crafts) polycondensation, as described in, inter alia, WO 84/03892. In the electrophilic polycondensation, carbonyl bridges are formed by reacting either dicarbonyl chlorides or phosgene with aromatics which contain two hydrogen atoms replaceable by electrophilic substituents. Furthermore, an aromatic carbonyl chloride which contains both an acyl chloride group and a substitutable hydrogen atom can be subjected to autopolycondensation.

Preferred process conditions for the synthesis of polyarylene ethers are described, for example in EP-A 113 112 and EP-A 135 130. The reaction of the monomers in aprotic solvents, in particular N-methylpyrrolidone, in the presence of anhydrous alkali metal carbonate, in particular potassium carbonate, is particularly suitable. In many cases, it has also proven advantageous to react the monomers in the melt.

Depending on the synthesis conditions chosen, the polyarylene ethers may have different terminal groups. At least 30% of the terminal groups must be capable of reacting with the anhydride groups of component C and of forming stable bonds (reactive terminal groups). Preferred reactive terminal groups are terminal amino, hydroxyl and epoxy groups.

Polyarylene ethers having one reactive terminal group per chain are preferred. The remaining terminal groups are inert. Inert terminal groups are halogen, in particular chlorine, alkoxy, especially methoxy or ethoxy, and aryloxy, preferably phenoxy or benzyloxy.

The synthesis of hydroxyl-terminated polyarylene ethers is possible, for example, by suitable choice of the stoichiometric ratio of dihydroxyl and dihalo monomers. (See for example H. G. Elias, Makromoleküle, 4th Edition, Hüthig & Wepf Verlag, Basle 1981, page 491). Polyarylene ethers having terminal epoxy groups are obtainable, for example, by reacting polyarylene ethers having terminal hydroxyl groups with epichlorohydrin (U.S. Pat. No. 4,448,948). Polyarylene ethers having terminal amino groups can be prepared, for example, by using p-aminophenol in the polycondensation (cf. J. E. McGrath et al, Polymer 30, 1552, 1989).

The novel graft copolymers contain, as component B, from 5 to 90, preferably 10 to 80, % by weight of thermoplastic polyamides.

These polyamides are known in principle and include semicrystalline and amorphous resins having a weight average molecular weight $M_w$ of at least 5000 g/mol. They are usually referred to as nylon. Such polyamides are described, for example in U.S. Pat. Nos. 2,071,250, 2,071,251, 2,130, 523, 2,130,948, 2,241,322, 2,312,966, 2,512,606 and 3,393, 210.

The polyamides B can be obtained by condensation of equimolar amounts of a dicarboxylic acid with a diamine. Suitable dicarboxylic acids are alkane dicarboxylic acids of 4 to 16, in particular 6 to 12, carbon atoms and aromatic dicarboxylic acids, preferably of 8 to 16 carbon atoms. Examples are adipic acid, azelaic acid, sebacic acid, dodecanedioic acid, terephthalic acid and isophthalic acid. Further suitable dicarboxylic acids are 2,6-pyridine dicarboxylic acid, 1,4-naphthalene dicarboxylic acid, 1,5-naphthalene dicarboxylic acid, 2,6-naphthalene dicarboxylic acid and di(4-carboxyphenyl) sulfone. Particularly suitable diamines are alkanediamines of 4 to 16, in particular 6 to 12 carbon atoms, such as hexamethylenediamine, its alkyl derivatives, such as 2-methylhexamethylenediamine, 3-methylhexamethylenediamine, 2,2,4-trimethylhexamethylenediamine, and 2,2,5-trimethylhexamethylenediamine, and m-xylylenediamine, di-(4-aminophenyl)methane, di-(4-aminocyclohexyl) methane, 2,2-di-(4-aminophenyl)propane or 2,2-di-(4-aminocyclohexyl)propane. Polyamides which are obtainable, for example, by condensation of 1,4-diaminobutane with adipic acid at elevated temperature may also be mentioned in this context (polyamide 4,6). Preparation processes for polyamides having this structure are described, for example in EP-A-38094, EP-A-38582 and EP-A 39524.

Polyamides can also be prepared by condensation of ω-aminocarboxylic acids or polyaddition of corresponding lactams. Examples of these are polyamides which are derived from lactams or ω-aminocarboxylic acids having 6 to 12 (ring) carbon atoms. They are generally semicrystalline.

In a preferred embodiment, amorphous polyamides which contain from 40 to 100, preferably from 50 to 99, % by weight of units derived from isophthalic acid from 0 to 60, preferably from 1 to 50, % by weight of units derived from terephthalic acid and hexamethylenediamine are used as essential building blocks.

These amorphous polyamides usually have a relative viscosity $\eta_{rel}$ of from 1.4 to 3.4, preferably from 1.5 to 2.8, determined using a 1% strength by weight solution in 96% strength by weight sulfuric acid.

Other preferred polyamides are polyhexamethyleneadipimide (nylon 66), polyhexamethyleneazelaamide (nylon 69), polyhexamethylenesebacimide (nylon 610), polyhexamethylenedodecanediamide (nylon 612) and polyhexamethyleneisophthalamide. Polyamides obtainable by ring cleavage of lactams, i.e. polycaprolactam (nylon 6), polycapryllactam or polylaurolactam, are furthermore preferred. The polyamide of 11-aminoundecanoic acid and a polyamide obtainable from di(4-aminocyclohexyl)methane and dodecanedioic acid are also preferred. These polyamides are generally semicrystalline.

Further suitable polyamides are those which were obtainable by copolymerization of two or more polyamide-forming monomers. Such partly aromatic copolyamides are composed of $b_1$) from 20 to 90% by weight of units derived from terephthalic acid and hexamethylenediamine, $b_2$) from 0 to 50% by weight of units derived from ε-caprolactam, $b_3$) from 0 to 80% by weight of units derived from adipic acid and hexamethylenediamine and $b_4$) from 0 to 40% by weight of units derived from further polyamide-forming monomers, the sum of the amounts by weight of $b_2$, $b_3$ and $b_4$ being at least 10% by weight and not more than 80% by weight. The amount of units derived from E-caprolactam is preferably from 20 to 50, in particular from 25 to 40, % by weight, while the amount of units derived from adipic acid and hexamethylenediamine is preferably from 30 to 75, in particular from 35 to 60, % by weight. These polyamides, too, are generally semicrystalline.

The copolyamides may simultaneously contain units of ε-caprolactam $b_2$ as well as units of adipic acid and hexamethylendiamine $b_3$; in this case, it is advantageous if the amount of $b_2$ and $b_3$ is at least 10, preferably at least 20, % by weight. The ratio of the units $b_1$ and $b_2$ is not subject to any particular restriction. Polyamides containing from 50 to 80, in particular from 60 to 75, % by weight of units $b_1$ and from 20 to 50, in particular from 25 to 40, % by weight of units $b_2$ have proven particularly advantageous.

Furthermore, the partly aromatic copolyamides may contain up to 40, preferably from 10 to 30, in particular from 20 to 30, % by weight of units $b_4$, derived from other amide-forming monomers. These include aromatic dicarboxylic acids of 8 to 16 carbon atoms, such as isophthalic acid, substituted terephthalic and isophthalic acid, eg. 3-tert-butylisophthalic acid, polynuclear dicarboxylic acids, e.g. 4,4'- and 3,3'-biphenyldicarboxylic acid, 4,4'- and 3,3'-diphenylmethanedicarboxylic acid, 4,4'- and di(3-carboxyphenyl) sulfone, 1,4- and 2,6-naphthalenedicarboxylic acid, and phenoxyterephthalic acid, but in particular isophthalic acid. These furthermore include aliphatic dicarboxylic acids of 4 to 16 carbon atoms, aliphatic and cycloaliphatic diamines of 4 to 16 carbon atoms, cyclic diamines, such as piperazine, and aminocarboxylic acids and corresponding lactams of 7 to 12 carbon atoms. Cycloaliphatic diamines are to be understood as meaning, for example bis(4-aminocyclohexyl)methane, bis (4-amino-3-methylcyclohexyl)methane, 2,2-bis(4-aminocyclohexyl)propane, 2,2-bis(4-amino-3-methylcyclohexyl)propane, cyclohexanediamine and isophoronediamine. Such polyamides are described in DE-A 4404250.

If component $b_4$ contains units derived from symmetrical dicarboxylic acids in which the carboxyl groups are in the para position, it is advisable to extend these to ternary copolyamides with $b_1$ and $b_2$ or $b_1$ and $b_3$, since otherwise the copolyamide has too high a melting point and only melts with decomposition, which is undesirable.

In a preferred embodiment, component B is composed of $b_1$) from 65 to 85% by weight of units derived from terephthalic acid and hexamethylenediamine and $b_4$) from 15 to 35% by weight of units derived from isophthalic acid and hexamethylenediamine.

Furthermore, polyamides composed of $b_1$) from 50 to 70% by weight of units derived from terephthalic acid and hexamethylenediamine, $b_3$) from 10 to 20% by weight of units derived from adipic acid and hexamethylenediamine $b_4$) from 20 to 30% by weight of units derived from isophthalic acid and hexamethylenediamine are particularly preferred.

Furthermore, partly aromatic copolyamides whose triamine content is less than 0.5, preferably less than 0.3, % by weight have proven particularly advantageous. A triamine content of more than 0.5% by weight is frequently observed in partly aromatic copolyamides which are prepared by conventional processes (cf. U.S. Pat. No. 4,603,166). A high triamine content leads to a deterioration in the product quality to problems in continuous preparation. A particular triamine which causes these problems is dihexamethylenetriamine, which is formed from the hexamethylenediamine used in the preparation.

Preparation of the preferred partly aromatic copolyamides having a low triamine content can be carried out by the processes described in EP-A 129 195 and 129 196.

The partly crystalline polyamides used according to the invention generally have a relative viscosity $\eta_{rel}$ of from 1.7 to 5.0, determined using a 1% strength by weight solution of the polyamides in 96% strength by weight sulfuric acid at 25° C. This corresponds to a K value (according to Fikentscher) of from 50 to 96 and a number average molecular weight of from about 15,000 to 45,000. Polyamides having a relative viscosity of from 2.3 to 4.5, in particular from 2.4 to 4.0, especially from 2.5 to 3.4, are preferably used.

The novel graft copolymers contain, as component C, from 10 to 90, preferably from 15 to 80, % by weight of a copolymer containing units derived from $c_1$) at least one aromatic vinyl compound,
$c_2$) at least one cyclic, α,β-unsaturated dicarboxylic anhydride,
$c_3$) at least one cyclic, α,β-unsaturated dicarboximide and
$c_4$) if required, at least one further monomer copolymerizable with $c_1$ to $c_3$.

The amount of units $c_1$ is preferably from 20 to 90, in particular from 40 to 80, particularly preferably from 50 to 75, mol %, based on component C. The aromatic vinyl compounds are preferably styrene and styrene derivatives. Examples of suitable styrene derivatives are α-methylstyrene and styrene derivatives substituted on the nucleus, such as vinyl toluene, p-tert-butylstyrene or chlorostyrene. Mixtures of different aromatic vinyl compounds may also be used.

Novel copolymers C very particular preferably contain units derived from styrene.

The amount of units $c_2$ derived from cyclic α,β-unsaturated dicarboxylic anhydrides is preferably from 1 to 50 mol %. Copolymers C having substantially less than 1 mol %, for example those having less than 0.5 mol %, of units $c_2$ are in general not sufficiently heat-resistant. Those having more than 50 mol % of $c_2$ cannot be prepared. The copolymers C used according to the invention contain particularly preferably from 1 to 35, in particular from 1 to 25, mol % of units $c_2$. Cyclic, α,β-unsaturated dicarboxylic anhydrides are preferably to be understood as meaning those which have from 4 to 20 carbon atoms. The double bond may be either exocyclic or endocyclic. The units $c_2$ are preferably derived from maleic anhydride, methylmaleic anhydride or itaconic anhydride. The copolymer C may also contain different units $c_2$.

In addition, the copolymers C preferably contain from 9 to 50, in particular from 15 to 50, particularly preferably from 24 to 49, mol % of units $C_3$ derived from cyclic α,β-unsaturated dicarboximides. In general, the cyclic α,β-unsaturated dicarboximides correspond to the abovementioned dicarboxylic anhydrides $c_3$. The imide units may carry a hydrogen atom on the nitrogen but have, as a rule, a $C_1$–$C_{20}$-alkyl radical, $C_4$–$C_{20}$-cycloalkyl radical, $C_1$–$C_{10}$-alkyl-$C_6$–$C_{18}$-aryl radical or a $C_6$–$C_{18}$-aryl radical.

The alkyl radicals may be either linear or branched and may contain one or more oxygen atoms in the chain, the oxygen atoms not being linked directly to the nitrogen atom and not being linked directly to another oxygen atom. The alkyl radicals include, for example methyl, ethyl, n-propyl, isopropyl, n-butyl, isobutyl, tert-butyl, n-hexyl, n-decyl and n-dodecyl. The cycloalkyl radicals may be either unsubstituted or substituted. Suitable substituents are, for example alkyl, such as methyl or ethyl. Examples of cycloalkyl radicals are cyclobutyl, cyclopentyl, cyclohexyl and 4-methylcyclohexyl. The alkylene moiety of the alkaryl radicals may be either linear or branched and may carry substituents. Examples of such substituents are halogen, such as chlorine or bromine. Examples of alkaryl radicals include benzyl, ethylphenyl and p-chlorobenzyl. The aryl radicals too, may carry 1, 2 or 3 substituents, for example methyl or ethyl or halogen, such as chlorine or bromine. Preferred aryl radicals or aryl moieties are phenyl and naphthyl. Particularly preferred radicals are cyclohexyl and phenyl The copolymer C may furthermore contain units $b_4$ derived from other compounds capable of free radical polymerization. If present, the units $b_4$ are preferably contained in an amount of up to 30, in particular from 5 to 25, mol %. Examples of such compounds are acrylic acid and methacrylic acid and derivatives thereof, such as acrylonitrile and methacrylonitrile or alkyl (meth)acrylate, such as ethyl acrylate or methyl methacrylate.

The distribution of the structural units $c_1$, $c_2$, $C_3$ and $c_4$ in copolymer C is random. As a rule, the copolymers C have weight average molecular weights $M_W$ of from 30,000 to 500,000, preferably from 50,000 to 250,000, and in particular from 70,000 to 200,000 g/mol.

The copolymers C can be prepared by free radical copolymerization of the corresponding monomers. The reaction may be carried out by suspension, emulsion, or solution, or mass polymerization, the last-mentioned procedure being preferred. The free radical reaction can be initiated by conventional methods, such as by means of light or, preferably, with free radical initiators such as peroxides, for example benzoyl peroxide.

The copolymers C may be prepared according to U.S. Pat. No. 4,404,322 by first subjecting the monomers corresponding to the structural units $c_1$, $c_2$ and, if required, $c_4$ to free radical copolymerization and then converting some of the anhydride groups present in the reaction product into imido groups by a polymer-analogous reaction with the corresponding primary amines or ammonia. This reaction is carried out, as a rule, in the presence of a tertiary amine, for example a trialkylamine or dialkylarylamine, e.g. triethylamine or N,N-diethylaniline, as a catalyst at from 80 to 350° C.

In this preparation variant, preferably from 50 to 75 mol % of aromatic vinyl compounds are reacted with from 25 to 50 mol % of cyclic α,β-unsaturated dicarboxylic anhydrides and the product is then treated with ammonia or a primary amine of ($c_5$) the molar ratio of amine to anhydride group being from 0.9 to 1.1.

The novel graft copolymers can be prepared, for example, by reacting components A, B and C in the melt. For this purpose, the starting components are mixed in a conventional mixing apparatus, such as an extruder, preferably a twin-screw extruder, a Brabender mill or a Banbury mill or a kneader, and the mixture is then extruded. After extrusion, the extrudate is cooled and comminuted.

Thorough mixing is advantageous for obtaining a very homogeneous material. In general, average mixing times of from 0.2 to 30 minutes at from 250 to 380° C., and preferably from 280 to 350° C., are required for this purpose.

The order in which the components are mixed may be varied. Thus, although two of the three components may be premixed, it is also possible to mix all three components together.

In another process, component A or B is reacted with C in solution or in the melt. The copolymer obtained is then reacted in solution or preferably in the melt with the lacking component B or A. Suitable solvents are dipolar aprotic liquids, such as dimethylformamide, dimethylacetamide and N-methylpyrrolidone, and mixtures of dipolar aprotic liquids with other organic solvents, for example chlorobenzene, o-dichlorobenzene, tetrahydrofuran, dichloromethane and trichloromethane. The reaction of the components is carried out at from 20 to 200° C., depending on the terminal group on polymer A. The reaction time is, as a rule, from 30 minutes to 24 hours. Usually, polymers A or B and C are each present in a concentration of from 1 to 30, in particular from 10 to 25, % by weight. The reaction product can be isolated by precipitation from the solution with a precipitating agent, such as water or ethanol. The reaction product is then reacted with the lacking component B or A in the manner described above.

The novel graft copolymers are multiphase copolymers, which is detectable, for example, from the presence of a plurality of glass transition temperatures.

In a novel embodiment, the graft copolymers are used as a basis for molding materials. These contain, as conventional additives, up to 60% by weight of fibrous or particulate fillers, up to 45% by weight of rubber impact modifiers and up to 40% by weight of additives such as flameproofing agents, pigments, stabilizers, antistatic agents and/or processing assistants, the parts by weight of these components being based on the total weight of the molding material.

The fillers, which preferably account for up to 55% by weight of the molding material, may be, for example, carbon, glass, quartz, aramid, alkali metal and alkaline earth metal carbonates and alkali metal and alkaline earth metal silicates.

Preferred fibrous fillers or reinforcing materials are carbon fibers, potassium titanate whiskers, aramid fibers and particularly preferably glass fibers. When glass fibers are used, they may be treated with a size and an addition promoter. In general, the carbon fibers and glass fibers used have a diameter of from 6 to 20 $\mu$m.

The glass fibers may be incorporated in the form of both short glass fibers and rovings. In the finished injection-molded part, the average length of the glass fibers is preferably from 0.08 to 0.5 mm.

Suitable particulate fillers are amorphous silica, magnesium carbonate (chalk), powdered quartz, glass beads and in particular calcium silicates, such as wollastonite and kaolin (in particular calcined kaolin).

Preferred combinations of fillers are, for example, 20% by weight of glass fibers with 15% by weight of wollastonite or 15% of glass fibers with 15% by weight of wollastonite. A further preferred combination contains, for example 20% by weight of carbon fibers and 20% by weight of wollastonite.

The novel molding materials furthermore preferably contain from 0 to 30% by weight of rubber impact modifiers. These include in particular those capable of making the polyarylene ethers, polyamides and/or copolymers C impact-resistant. These properties are met by, for example, EP or EPDM rubbers which are grafted with suitable functional groups. For example, maleic anhydride, itaconic acid, acrylic acid, glycidyl acrylate and glycidyl methacrylate are suitable for this purpose.

These monomers can be grafted onto the polymer in the melt or in solution, in the presence or absence of a free radical initiator such as cumene hydroperoxide.

Further suitable rubber impact modifiers are copolymers of $\alpha$-olefins. The $\alpha$-olefins are usually monomers of 2 to 8 carbon atoms, preferably ethylene and propylene. Alkyl acrylates or alkyl methacrylates derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate, have proven suitable comonomers. Mixtures of different comonomers may also be used. Copolymers of ethylene with ethyl or butyl acrylate and acrylic acid and/or maleic anhydride have proven particularly suitable.

The copolymers can be prepared in a high pressure process at from 400 to 4500 bar or by grafting the comonomers onto the poly-$\alpha$-olefin. The $\alpha$-olefin content of the copolymer is in general from 99.95 to 55% by weight.

A further group of suitable impact modifiers comprises core-shell graft rubbers. These are graft rubbers prepared in emulsion and consisting of at least one hard and one soft component. A hard component is usually understood as meaning a polymer having a glass transition temperature of at least 25° C., and a soft component as meaning a polymer having a glass transition temperature of not more than 0° C. These products have a structure having a core and at least one shell, the structure being determined by the order of addition of the monomers. The soft components are generally derived from butadiene, isoprene, alkyl acrylates, alkyl methacrylates or siloxanes and, if required, further comonomers. Suitable siloxane polymers can be prepared, for example, starting from cyclic octamethyltetrasiloxane or tetravinyltetramethyltetrasiloxane. These polymers can be prepared by ring-opening cationic polymerization, for example using $\gamma$-mercaptopropylmethyldimethoxysilane, preferably in the presence of sulfonic acids. The siloxanes may also be cross-linked by, for example, carrying out the polymerization reaction in the presence of silanes having hydrolyzable groups, such as halogen or alkoxy, e.g. tetraethoxysilane, methyltrimethoxysilane or phenyltrimethoxysilane. Examples of suitable comonomers here are styrene, acrylonitrile and crosslinking or graft-active monomers having more than one polymerizable double bond, such as diallyl phthalate, divinylbenzene, butanediol diacrylate or triallyl (iso)cyanurate. The hard components are derived in general from styrene, $\alpha$-methylstyrene and copolymers thereof, acrylonitrile, methacrylonitrile and methylmethacrylate preferably being used as comonomers.

Preferred core-shell graft rubbers contain a soft core and a hard shell or a hard core, a first soft shell and at least one further hard shell. Functional groups, such as carbonyl, carboxyl, anhydride, amido, imido, carboxylic ester, amino, hydroxyl, epoxy, oxazoline, urethane, urea, lactam or halobenzyl groups, are preferably incorporated here by adding suitable functionalized monomers in the polymerization of the final shell. Suitable functionalized monomers are, for example, maleic acid, maleic anhydride, mono- or diesters of maleic acid, tert-butyl (meth)acrylate, acrylic acid, glycidyl (meth)acrylate and vinyloxazoline. The amount of monomers having functional groups is in general from 0.1 to 25, preferably from 0.25 to 15, % by weight, based on the total weight of the core-shell graft rubber. The weight ratio of soft to hard components is in general from 1:9 to 9:1, preferably from 3:7 to 8:2.

Such rubbers are known per se and are described, for example, in EP-A 208 187.

A further group of suitable impact modifiers comprises thermoplastic polyester elastomers. Polyester elastomers are understood as meaning segmented copolyether esters which contain long-chain segments, derived as a rule from poly (alkylene) ether glycols and short-chain segments, derived from low molecular weight diols and dicarboxylic acids. Such products are known per se and are described in the literature, for example in U.S. Pat. No. 3,651,014. Appropriate products are also commercially available, under the names Hytrel® (Du Pont), Arnitel® (Akzo) and Pelprene® (Toyobo Co. Ltd.).

Mixtures of different rubbers can of course also be used.

The novel molding materials may furthermore contain additives which are typical of, and commonly used for, polyarylene ethers, polyamides and styrene/maleic anhydride copolymers. Examples of such additives are dyes, pigments, antistatic agents, antioxidants and processing assistants, in particular lubricants, which are required for the further processing of the molding material, for example in the production of moldings or shaped articles. The novel molding materials are prepared by processes which are known per se, by mixing components A, B and C and, if required, the fillers, impact modifiers and additives. It may be advantageous to premix individual components. Mixing is preferably carried out at the temperatures which were stated in the preparation of the graft copolymers, by extruding, kneading or roll-milling the components together, until the molding material has microscopic homogeneity.

It is also possible to mix the prepared graft copolymers with the fillers, impact modifiers and additives, preferably in the melt, and then to extrude the mixture.

The novel thermoplastic molding materials can be processed by the known methods for processing thermoplastics, for example by extrusion, injection molding, calendering, blow molding, compression molding or sintering.

In another embodiment of the invention, the graft copolymers are used as compatibilizers for polymer blends based on polyarylene ethers without reactive terminal groups and thermoplastic polyamides (component B). The polyarylene ethers have the above-mentioned groups as inert terminal groups.

These molding materials usually contain from 1 to 98, preferably from 5 to 93, in particular from 17 to 80, % by weight of polyarylene ethers having inert terminal groups, from 1 to 98, preferably from 5 to 93, and in particular from 17 to 80, % by weight of polyamides (component B) and from 1 to 30, preferably from 2 to 20, in partiuclar 3 to 15, % by weight of the graft copolymer as a compatibilizer. Moreover, these molding materials may contain, as further components, the abovementioned fillers, impact modifiers and additives in the abovementioned amounts. These molding materials are prepared in the manner described for the preparation of the molding materials based on graft copolymer.

The novel molding materials have good mechanical properties, such as impact strength, and high stability in continuous use and high heat distortion resistance. They are therefore suitable for many applications, for example highly stressed parts in automotive construction, housing parts for medical equipment, electrical appliances, etc.

The examples which follow illustrate the present invention without restricting it.

EXAMPLES

Testing of performance characteristics

Heat distortion resistance: Determination of the Vicat softening temperature using standard small bars according to DIN 53460 with a force of 49.05N and a temperature increase of 50° C./h.

Flowability: According to DIN 53735, at 320° C. and under a load of 21.6 kg.

Tensile strength: Tensile test according to DIN 53455, the test specimens being tested before and after being subjected to thermal stress (160° C., 21 days).

Elongation at break $\epsilon_R$: Tensile test according to DIN 53455, the test specimens being tested after being subjected to thermal stress (160° C.; 6 days).

Viscosity no. (VN): Determination of the viscosity of a 1% strength solution of the polymer in N-methylpyrrolidone at 25° C.

The viscosity number of the polyamides was determined on the basis of the viscosity of a 1% strength solution in concentrated sulfuric acid at 25° C.

Softening and melting points: DSC 2000 from Du Pont.

Conversion: Extracted fraction of components A and B in a selective extraction with dimethylformamide and formic acid, respectively.

Concentration of terminal hydroxyl groups: Potentiometric titration of the hydroxyl groups with methanolic KOH solution in dimethylformamide.

Concentration of terminal amino groups: Potentiometric titration of the amino groups with trifluoromethanesulfonic acid in o-dichlorobenzene.

Concentration of terminal chlorine groups: Determination of the organically bonded chlorine content of the polymer.

Components $A_I$: Polyaryl ether obtained from 4,4'-di(4-hydroxyphenyl) sulfone and di(4-chlorophenyl) sulfone (VN=46.2 ml/g, 97% of terminal Cl groups, 3% of terminal OH groups, $T_g$=217° C.).

$A_{II}$: Polyaryl ether obtained from 4,4'-di(4-hydroxyphenyl) sulfone and di(4-chlorophenyl) sulfone (VN=31.5 ml/g, 43% of terminal $NH_2$ groups, 7% of terminal OH groups, 50% of terminal Cl groups, $T_g$=214° C.).

$A_{III}$: Polyaryl ether obtained from 4,4'-di(4-hydroxyphenyl) sulfone and di(4-chlorophenyl) sulfone (VN=18.9 ml/g, 73% of terminal $NH_2$ groups, 25% of terminal OH groups, 2% of terminal Cl groups, $T_g$=210° C.).

$B_I$: Polyamide obtained from hexamethylenediamine and isophthalic acid: VN=62 ml/g (1% strength solution in concentrated sulfuric acid), 0.15 % by weight of terminal $NH_2$ groups, $T_g$=126° C.

$B_{II}$: Partly aromatic copolyamide consisting of 55 parts of terephthalic acid, 35 parts of caprolactam and 38.5 parts of hexamethylenediamine: relative viscosity $\eta_{rel}$=2.4 (1% strength solution in concentrated sulfuric acid), 0.18% by weight terminal $NH_2$ groups, $T_g$=100° C., $T_m$=290° C.

$C_I$: Terpolymer consisting of 58 mol % of styrene, 3 mol % of maleic anhydride and 39 mol % of N-phenylmaleimide ($T_g$=206° C.).

$C_{II}$: Terpolymer consisting of 58 mol % of styrene, 8 mol % of maleic anhydride and 34 mol % of N-phenylmaleimide ($T_g$=204° C.).

V: Polyarylene ether obtained from 4,4'-dihydroxydiphenyl sulfone and 4,4'-dichlorodiphenyl sulfone (VN=54 ml/g, $T_g$=225° C., 60% of terminal Cl groups, 40% of terminal $OCH_3$ groups, commercial product Ultrason® E 2010, BASF).

Furthermore, a condensate of bisphenol A and epichlorohydrin was used as a compatibilizer for comparison purposes: relative viscosity $\eta_{rel}$=1.13 (0,5% strength solution in dichloromethane, 25° C.) Phenoxy® from UCC.

Preparation of the novel craft copolymers

Example 1

50 g of component $A_{II}$, are added to a solution of 100 g of component $C_{II}$ in 750 ml of N-methylpyrrolidone under an inert gas atmosphere at 0° C. and with thorough stirring. The reaction mixture is then stirred for a further 30 minutes at 0° C. and then heated at 190° C. for 8 hours. After cooling of the solution, the product ($Z_1$) is isolated by precipitation in water and then dried for 8 hours at 120° C. under reduced pressure.

Graft copolymers $P_I$ and $P_{II}$ are obtained in a Haake kneader by reacting in each case 35 g of $Z_I$ with 15 g of $B_I$ or $B_{II}$, at 320° C. (reaction time 5 minutes). The results of the characterization of these products are shown in Table 1.

Example 2

A mixture of 20 g of component $A_{III}$, 15 g of component $B_I$ (or $B_{II}$) and 15 g of component $C_I$ is thoroughly mixed at 320° C. for 5 minutes in a Haake kneader, and the molding material obtained is discharged and comminuted. Graft copolymers $P_{III}$ and $P_{IV}$ are obtained. The results of the characterization of $P_{III}$ and $P_{IV}$ are shown in Table 1.

Comparative Example 1

A mixture of 20 g of component $A_I$, 15 g of component $B_I$ and 15 g of component $C_{II}$ is thoroughly mixed at 320° C. for 5 minutes in a Haake kneader, and the molding material obtained is discharged and comminuted. The results of the characterization of this product $V_1$ are shown in Table 1.

Example 3

A mixture of 3 kg of component $A_{II}$, 2 kg of component $C_{II}$ and 2 kg of component $B_{II}$, is mixed in a twin-screw extruder (ZSK 30, Werner & Pfleiderer) at 340° C. The extrudate is cooled in a water bath and granulated. The results of the characterization of the resulting product $P_V$ are shown in Table 1.

TABLE 1

| | Example No. | | | | | |
|---|---|---|---|---|---|---|
| | 1 | | 2 | 3 | | V1 |
| Product | $P_I$ | $P_{II}$ | $P_{III}$ | $P_{IV}$ | $P_V$ | $V_I$ |
| $T_g$ [° C.] | 126 | 100 | 126 | 100 | 100 | 126 |
| | 204 | 204 | 206 | 204 | 204 | 204 |
| | 213 | 214 | 210 | 210 | 214 | 217 |
| $T_m$ [° C.] | — | 290 | — | 290 | 290 | — |
| extractable fraction A/C [%] | 3.2 | 3 | 6 | 6.4 | 5.1 | 98 |
| Extractable fraction B [%] | 1.7 | 0.9 | 1.2 | 1.6 | 1.9 | 1.0 |
| Vicat B [° C.] | 200 | 202 | 199 | 201 | 203 | 203 |

Table 1 shows that polyarylene ethers having a sufficient number of reactive terminal groups, polyamides and copolymers C react to give graft copolymers, and that in all cases multiphase products were obtained. When a polyarylene ether having only 3% of reactive terminal groups is used, only a slight reaction takes place.

Use of the graft copolymers as compatibilizers
(Examples 4 and 5 and Comparative Examples V2–V4)

In order to demonstrate the efficiency as compatabilizers for polyarylene ether/polyamide blends, the molding materials shown in Table 2 were prepared and characterized:

Molding materials $V_2$–$V_4$, 4 and 5 were prepared by extrusion in a ZSK 30 twin-screw extruder from Werner & Pfleiderer at a barrel temperature of 340° C. and with a throughput of 10 kg/h.

The granules were processed to moldings at a material temperature of 340° C. and a mold temperature 100° C.

TABLE 2

| Example | V2 | V3 | V4 | 4 | 5 |
|---|---|---|---|---|---|
| V [% by wt] | 100 | 70 | 63 | 66.5 | 63 |
| B [% by wt] | — | 30 | 27 | 28.5 | 27 |
| $P_v$ [% by wt] | — | — | — | 5 | 1 |
| Phenoxy ® [% by wt] | — | — | 10 | — | — |
| Vicat B [° C.] | 218 | 207 | 198 | 206 | 206 |
| MVI [ml/10'] | 64 | 201 | 219 | 204 | 205 |

TABLE 2-continued

| Example | V2 | V3 | V4 | 4 | 5 |
|---|---|---|---|---|---|
| Tensile strength | | | | | |
| 0 d, 160° C. [N/mm²] | 88 | 91 | 90 | 92 | 93 |
| 21 d, 160° C. [N/mm²] | 82 | 79 | 54 | 80 | 81 |
| Ult. tensile strength $\epsilon_R$ | | | | | |
| 6 d, 160° C. [%] | 40 | 1.7 | 17 | 26 | 32 |

As is evident from Table 2, the novel molding materials have higher heat distortion resistance and heat stability than the molding material containing Phenoxy® as a compatibilizer. Compared with the compatibilizer-free blend, better flowability and better heat stability are found. Furthermore, the elongation at break is substantially increased.

We claim:

1. A graft copolymer obtained by reacting

A) from 5 to 85% by weight of at least one polyarylene ether having at least 30% of reactive terminal groups which are capable of reacting with the functional groups of component C, B) from 5 to 85% by weight of at least one thermoplastic polyamide and C) from 10 to 90% by weight of at least one copolymer which is composed of $c_1$) at least one aromatic vinyl compound, $c_2$) at least one cyclic, $\alpha,\beta$-unsaturated dicarboxylic anhydride, $c_3$) at least one cyclic, $\alpha,\beta$-unsaturated dicarboximide, $c_4$) if required, at least one further monomer copolymerizable with $c_1$ to $c_3$, with the proviso that the amounts by weight of A, B and C sum to 100% by weight.

2. A graft copolymer as claimed in claim 1, obtained by reacting component A in an amount of from 10 to 75% by weight, component B in an amount of from 10 to 75% by weight and component C in an amount of from 15 to 80% by weight.

3. A graft copolymer as claimed in claim 1, starting from polyarylene ethers A), which have hydroxyl, amino or epoxy groups as reactive terminal groups.

4. A graft copolymer as claimed in claim 1, in which the polyarylene ethers contain repeating units of the formula I

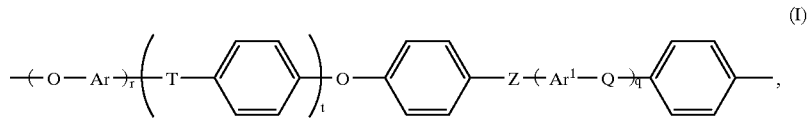

(I)

where t and q independently of one another are each 0, 1, 2 or 3,

T, Q and Z are identical or different and, independently of one another may each be a chemical bond or a member selected from the group consisting of from —O—, —S—, —SO$_2$—, >S=O, >C=O, —N=N—, —R$^a$C=CR$^b$— and —CR$^c$R$^d$—, with the proviso that at least one of the groups T, Q and Z is —SO$_2$— or C=O, R$^a$ and R$^b$ are each hydrogen or C$_1$–C$_{10}$-alkyl, R$^c$ and R$^d$ are each hydrogen, C$_1$–C$_{10}$-alkyl, C$_1$–C$_{10}$-alkoxy or C$_6$–C$_{18}$-aryl, where the abovementioned groups may each be substituted by fluorine and/or chlorine, and Ar and Ar$^1$ are each C$_6$–C$_{18}$-arylene, where these groups may furthermore have substituents selected from C$_1$–C$_{10}$-alkyl, C$_6$–C$_{18}$-aryl, C$_1$–C$_{10}$-alkoxy and halogen.

5. A graft copolymer as claimed in claim 4, in which the polyarylene ethers A) contain a$_1$) from 3 to 97 mol % of repeating units I$_1$

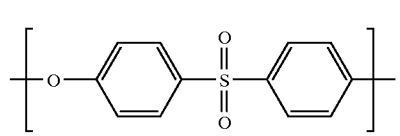

a$_2$) 3 to 97 mol % of repeating units I$_2$

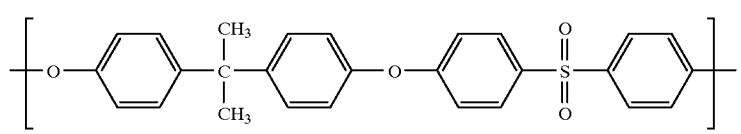

6. A graft copolymer as claimed in claim 1, which contains, as component B a polyamide which is composed of b$_1$) from 20 to 90% by weight of units derived from terephthalic acid and hexamethylenediamine, b$_2$) from 0 to 50% by weight of units derived from ε-caprolactam, b$_3$) from 0 to 80% by weight of units derived from adipic acid and hexamethylenediamine b$_4$) from 0 to 40% by weight of units derived from further polyamide-forming monomers, the sum of the amounts by weight of b$_2$, b$_3$ and b$_4$ being at least 10% by weight and not more than 80% by weight.

7. A graft copolymer as claimed in claim 1, which contains, as component B, an amorphous polyamide which is composed of b$_5$) from 60 to 100% by weight of units derived from isophthalic acid and hexamethylenediamine and b$_6$) from 0 to 40% by weight of units derived from terephthalic acid and hexamethylenediamine.

8. A graft copolymer as claimed in claim 1, in which the copolymers C are composed of c$_1$) from 20 to 90, mol % of aromatic vinyl compounds, c$_2$) from 1 to 50, mol % of cyclic, α,β-unsaturated dicarboxylic anhydrides, c$_3$) from 9 to 50, mol % of cyclic, α,β-unsaturated dicarboximides and c$_4$) from 0 to 30, mol % of further units derived from monomers capable of free radical polymerization.

9. A graft copolymer as claimed in claim 1, in which the copolymer C is composed of units which are derived from c$_1$) styrene, c$_2$) maleic anhydride and c$_3$) N-phenylmaleimide.

10. In a method for formulating polymer blends based on polyarylene ethers and polyamides, the improvement comprising adding to said blends a graft copolymer as defined in claim 1.

11. A thermoplastic molding material comprising (I) at least one graft copolymer as claimed in claim 1, (II) from 0 to 60% by weight of fibrous or particulate fillers, (III) from 0 to 45% by weight of rubber impact modifiers and (IV) from 0 to 40% by weight of at least one additive selected from the group consisting of flameproof agents, pigments, stabilizers, antistatic agents and processing assistants, the amounts by weight of components (II) to (IV) being based on the total weight of the molding material.

12. A thermoplastic molding material as claimed in 11, comprising (I) from 1 to 30% by weight of at least one graft copolymer as claimed in claim 1, (II) from 0 to 60% by weight of fibrous or particulate fillers, (III) from 0 to 45% by weight of rubber impact modifiers, (IV) from 0 to 40% by weight of at least one additive selected from the group consisting of flameproofing agents, pigments, stabilizers, antistatic agents and processing assistants, (V) from 1 to 98% by weight of at least one polyarylene ether without reactive terminal groups and (VI) from 1 to 98% by weight of at least one thermoplastic polyamide, the amounts by weight of components (I) to (VI) being based on the total weight of the molding material.

* * * * *